(12) United States Patent
Truan et al.

(10) Patent No.: US 9,271,441 B2
(45) Date of Patent: Mar. 1, 2016

(54) SPREADER DEVICE

(71) Applicants: Charles Truan, Bloomfield Hills, MI (US); Barry Truan, Troy, MI (US)

(72) Inventors: Charles Truan, Bloomfield Hills, MI (US); Barry Truan, Troy, MI (US)

(73) Assignee: Douglas Dynamics, L.L.C., Milwaukee, WI (US)

( * ) Notice: Subject to any disclaimer, the term of this patent is extended or adjusted under 35 U.S.C. 154(b) by 0 days.

(21) Appl. No.: 14/310,051

(22) Filed: Jun. 20, 2014

(65) Prior Publication Data

US 2014/0374515 A1 Dec. 25, 2014

Related U.S. Application Data

(60) Provisional application No. 61/837,690, filed on Jun. 21, 2013, provisional application No. 61/840,056, filed on Jun. 27, 2013.

(51) Int. Cl.
*A01C 17/00* (2006.01)
*E01H 10/00* (2006.01)

(52) U.S. Cl.
CPC ............. *A01C 17/003* (2013.01); *A01C 17/006* (2013.01); *E01H 10/007* (2013.01)

(58) Field of Classification Search
CPC .... A01C 17/003; A01C 7/163; A01C 15/007; A01C 17/006; A01G 25/16; A01G 25/25–25/165; E01H 10/007
USPC ............. 239/650, 668, 669, 677, 683, 67, 69
See application file for complete search history.

(56) References Cited

U.S. PATENT DOCUMENTS

| | | | | |
|---|---|---|---|---|
| 4,430,846 A * | 2/1984 | Presley | ............. | A01D 41/1274 137/115.06 |
| 4,967,544 A * | 11/1990 | Ziegler | ................. | A01D 41/127 460/1 |
| 5,533,677 A * | 7/1996 | McCaffrey | ............... | A01C 3/06 239/677 |
| 5,979,703 A * | 11/1999 | Nystrom | ................. | A01C 15/00 111/903 |
| 2006/0169806 A1 * | 8/2006 | Neier | ..................... | A01C 3/066 239/667 |

* cited by examiner

*Primary Examiner* — Davis Hwu
(74) *Attorney, Agent, or Firm* — Dickinson Wright PLLC

(57) ABSTRACT

A material spreader having a beater bar that meters the supply of small quantities of material to the discharge opening of a material spreader hopper eliminating the need for a gate. The beater bar has one and preferably several paddles that rotate adjacent the discharge opening and as the paddle passes the opening, discharges only the amount of material on the paddle. The material spreader uses a high ratio transmission and low rpm motor to allow for extremely slow rotation of the beater bar. The motor speed can be controlled to allow very slow rotation and very small amounts of material to be discharged from the hopper. The spreader does not require a gate. The discharge of material is metered electronically.

29 Claims, 6 Drawing Sheets

SPREADER DEVICE

RELATED APPLICATIONS

This application claims benefit to provisional application No. 61/837,690, filed on Jun. 21, 2013, and titled Spreader Device and provisional application No. 61/840,056, filed Jun. 27, 2013 and titled Spreader Device.

STATEMENT REGARDING FEDERALLY SPONSORED RESEARCH

NONE

TECHNICAL FIELD

This invention relates generally to material spreading devices, such as for example a salt, seed or fertilizer spreader and, more particularly, to material spreading devices using a beater bar to discharge the material from a discharge opening in the hopper of the spreader.

BACKGROUND OF THE INVENTION

Material spreaders are commonly used to spread salt, sand, or salt and sand mixtures over a surface to control ice and snow on the surface. There are many types of spreader assemblies, examples of such assemblies are shown in U.S. Pat. Nos. 6,089,478; D425,915; 6,422,490; and 7,347,390 all assigned to the assignee of the present application.

Known spreaders have a hopper for containing the material to be spread and use for example an auger or conveyor to move the material to the discharge opening of the hopper. In some units, the material is discharged directly from the discharge opening to the surface to be treated. In others, there is a spinner adjacent the discharge opening that receives the material and distributes the material by spinning and throwing the material over the surface to be treated.

One problem with these known spreaders is that they are not well suited to treat smaller surfaces. For example, sidewalks require a smaller amount of material to be spread over a much smaller area. Known spreaders over-spread material on sidewalks, since they are not readily capable of spreading smaller amounts over smaller areas. Known spreaders will distribute too much material and will spread the material beyond the desired area. This results in excessive material being spread, wasting resources, and material being spread over undesired areas, such as vegetation, which can be detrimental to the vegetation.

Additionally, known spreaders also have a gate that is adjusted manually which requires a speed change or gate change to have different output.

The present invention as described below, overcomes these problems with known material spreaders.

SUMMARY OF THE INVENTION

In general terms, the present invention provides a material spreader that uses a beater bar that can slowly supply small quantities of material to the discharge opening of a material spreader hopper. The beater bar has one and preferably several paddles that rotate adjacent the discharge opening and as the paddle passes the opening, discharges only the amount of material on the paddle. The present invention uses a high ratio transmission and low rpm motor to allow for extremely slow rotation of the beater bar. The motor speed can be controlled to allow very slow rotation and very small amounts of material to be discharged from the hopper.

In one embodiment, the discharge opening extends longitudinally along the bottom of the hopper and the material is distributed directly from the discharge opening as the beater bar passes over the opening. In another embodiment, a spinner is used to distribute material over a surface. The discharge opening in the later embodiment is smaller and the material discharged falls onto the spinner. The spinner spins to distribute the material.

Both embodiments also have the added benefit of stopping the discharge of material when the beater bar is stopped. Since the only material that is distributed is what is on the paddle adjacent the discharge opening, if the paddles do not move, the discharge opening does not receive any material and there is no discharge.

The use of a slow rotating beater bar allows for very controlled material distribution allowing the operator to use less overall material than previously known spreader devices. The operator may then realize greater profits as less material is used to receive the desired results and the operator may better control the distribution of the material.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
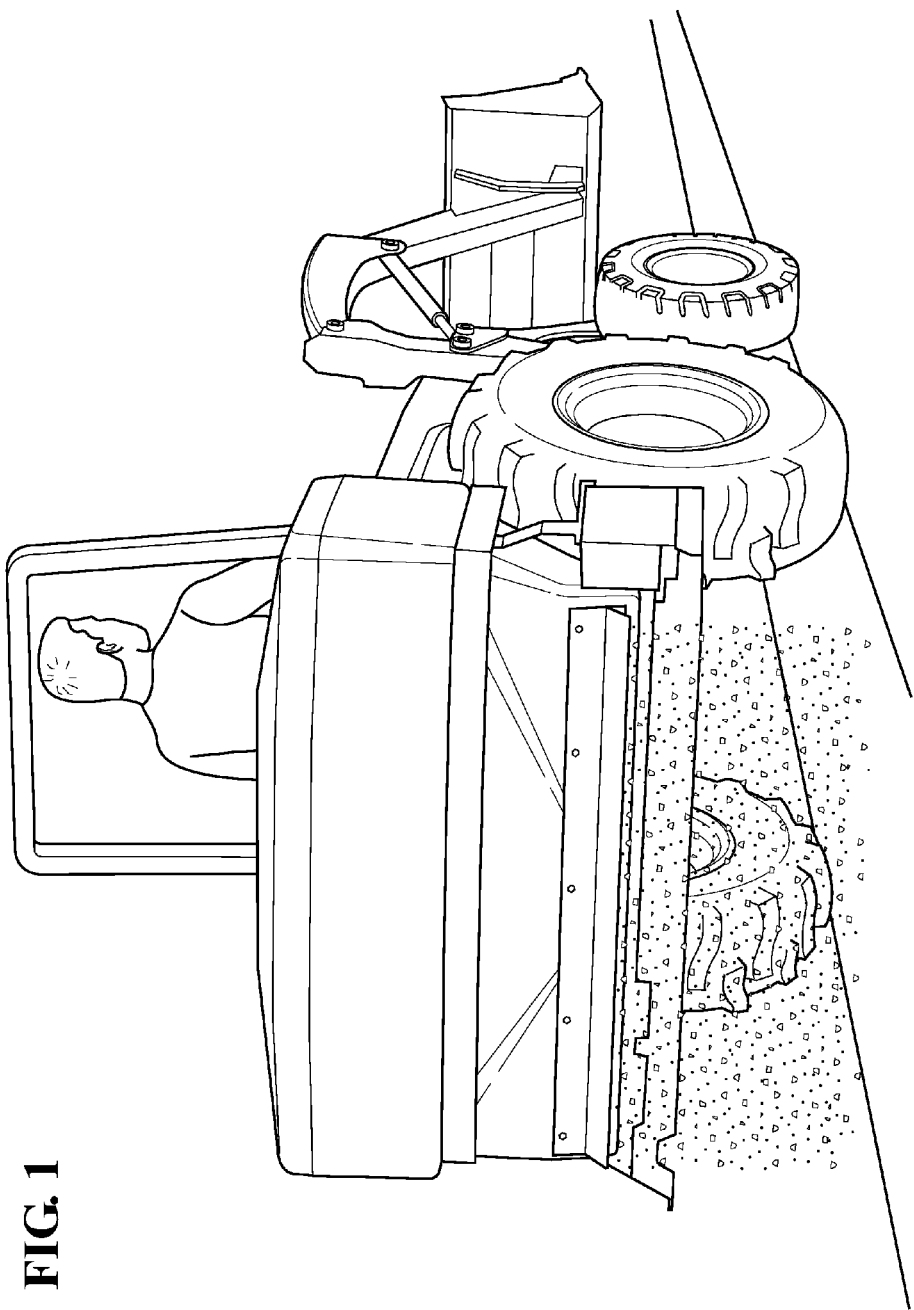
FIG. 1 is a perspective view of a vehicle with the device of the present invention mounted to the rear of the vehicle.
Figure 2:
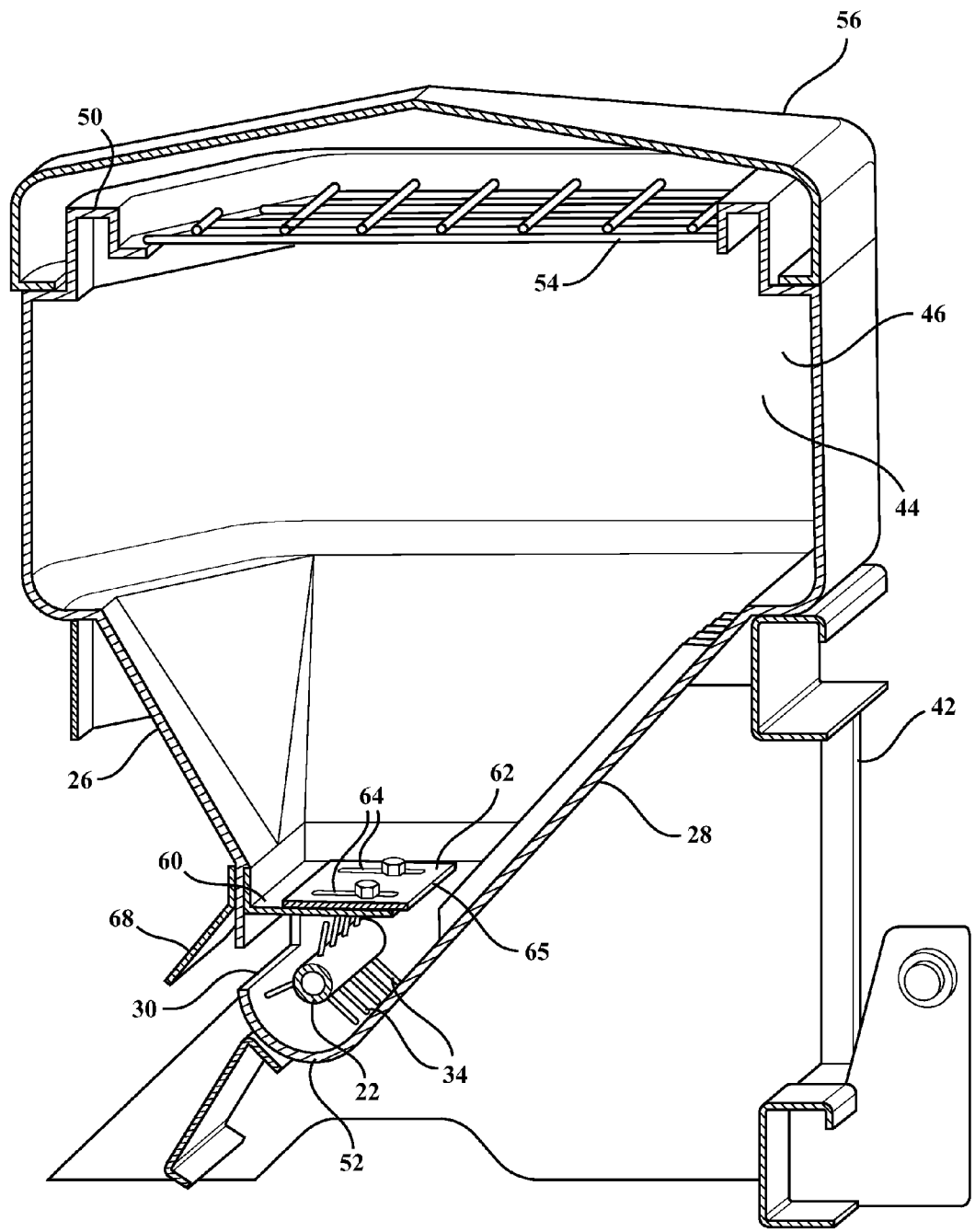
FIG. 2 is a cutaway view between the first and second walls of the material spreader of the first embodiment of the present invention.
Figure 3:
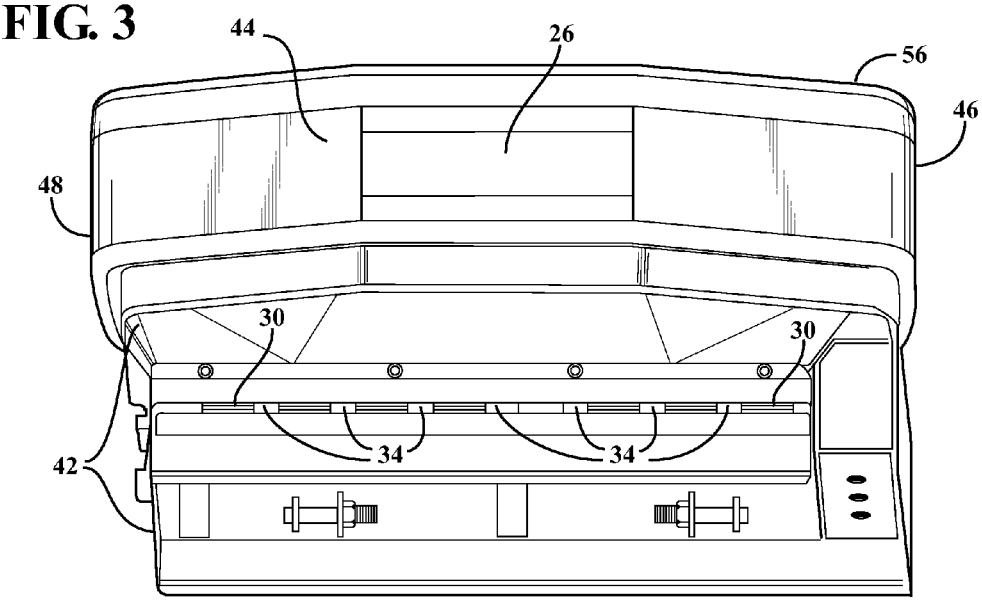
FIG. 3 is a front view of the first embodiment of the material spreader of the present invention.

With reference to FIGS. 1, 2 and 3, the spreader device 20 of the present invention has a hopper 44 defined by a first wall 26 opposite a second wall 28 and a third wall 46 opposite a fourth wall 48, a top 50, and a bottom 52. The hopper 44 contains a surface treatment material, such as for example, salt, salt and sand mixture, sand, seed or fertilizer. It should be recognized that the term material may be used herein to include a surface treatment material, such as salt, sand, a mixture of salt, sand seed or fertilizer, or any desirable surface treatment material used for removing snow and/or ice from a surface or turf treatment. A surface may be a road, a sidewalk, a walkway, or any other surface which may have snow and/or ice or any form of turf.

The first wall 26 has an opening 30 near the bottom 52 of the hopper 44. In a first embodiment, the opening 30 extends longitudinally between the third wall 46 and the fourth wall 48, (see FIGS. 3 and 4). The opening 30 of the first embodiment generally extends the entire extent of the first wall 26. In a second embodiment, the opening 30 extends between the third wall 46 and the fourth wall 48, but is much shorter in length and supplies a spinner 24.

In the disclosed embodiment, the first wall 26 and the second wall 28 slope upwards from the bottom 52 of the hopper 44, with the slope of the first wall 26 and the slope of the second wall 28 being different. The different slopes between the first wall 26 and the second wall 28 can be seen in FIG. 2. The different slopes between the first wall 26 and the second wall 28 assists the surface treatment material in moving through the hopper 44 towards the bottom 52. A screen 54 may be used on the top 50 of the hopper 44 to prevent larger material from entering the hopper 44. A cover 56 can be used if desired to fit over the top 50 of the hopper to close the hopper 20. The hopper 44 may also be disposed in a frame 42 for mounting the hopper 44 to a truck bed, a tractor, or to any other motorized vehicle. The frame 42 can be mounted to the vehicle, through for example a reese type hitch or in the bed of the vehicle. In a still further embodiment, the spreader can be pulled behind a vehicle.

Figure 6:
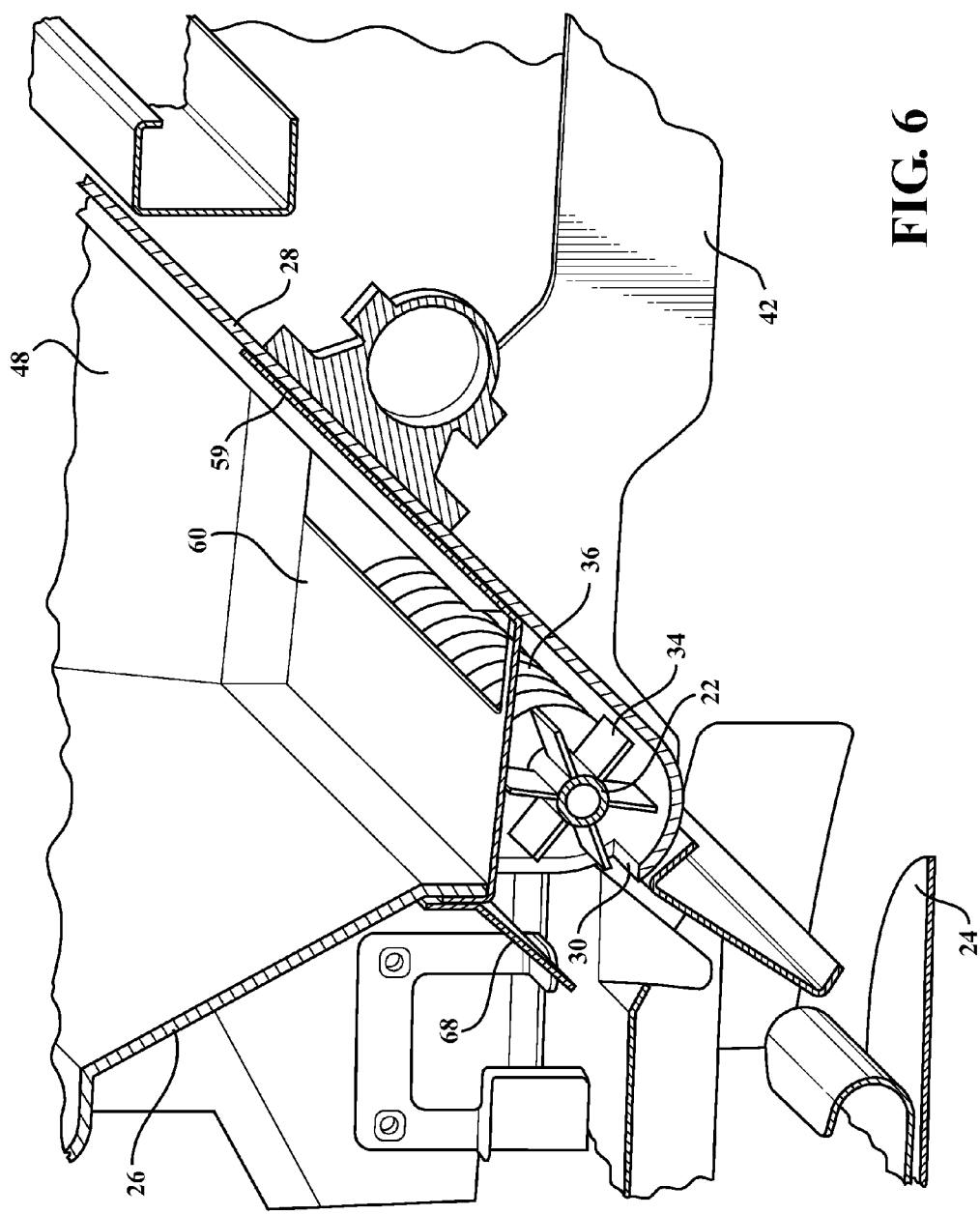
FIG. 6 is a cutaway view of the second embodiment of the material spreader of the present invention.
Figure 7:
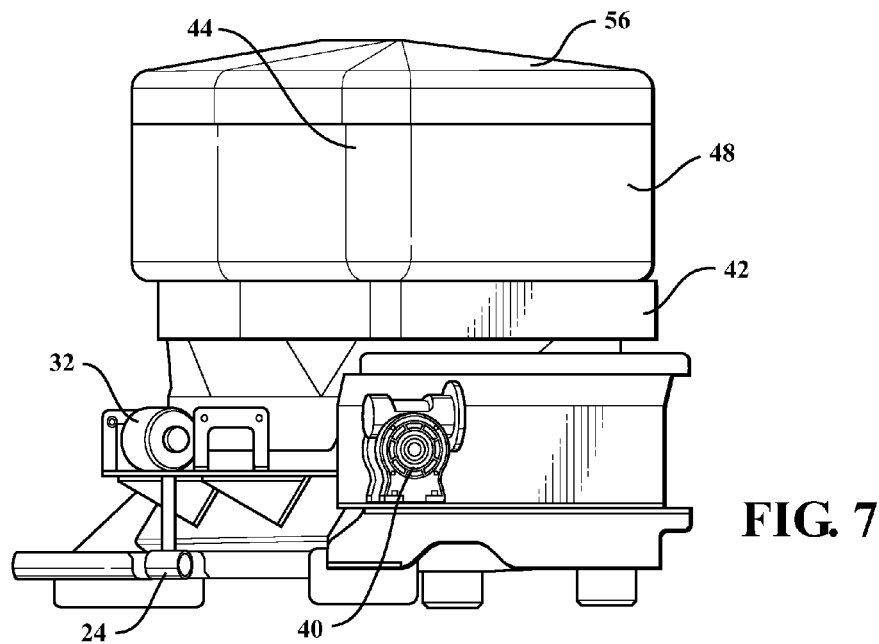
FIG. 7 is a side view of the second embodiment of the material spreader of the present invention.

With reference to FIGS. 2 and 6, a beater bar 22 or material distribution shaft having a plurality of paddles 34 is located at or near the bottom 52 of the hopper 44 and extends between the third wall 46 and the fourth wall 48 for moving material to the opening 30 in the first wall 26. As shown in FIGS. 2 and 3, there are three sets of paddles 34 radially disposed on the outside of the beater bar 22. It should be appreciated by those of ordinary skill the art, that one of more sets of paddles 34 could be used. As the beater bar 22 rotates, the paddles 34 pick-up material in the bottom 52 and supply that material to the opening 30. In the discussed embodiment, the individual paddles 34 in a single row are spaced apart, creating a gap between each paddle. The next adjacent row of paddles are similarly spaced, but positioned such that the paddles in that row are opposite a gap in the previous row.

Figure 8:
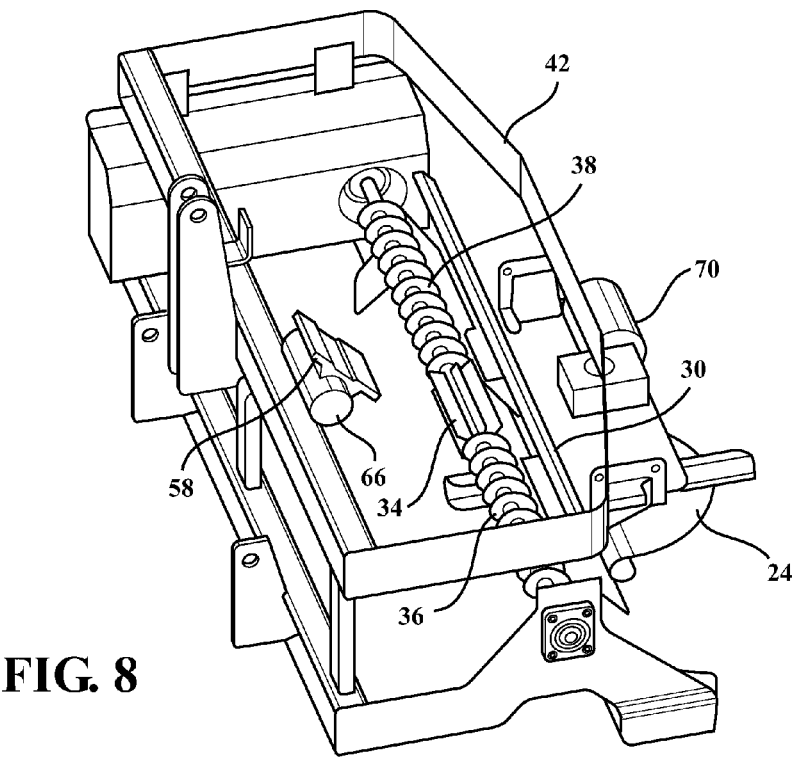
FIG. 8 is an elevational view showing the frame and beater bar of the second embodiment of the material spreader of the present invention.

With reference to FIG. 8, a shaker 58 with a vibration motor 66 may be disposed adjacent the hopper 44 and is operatively connected to a first baffle 60 and a second baffles 62. In the disclosed embodiment, the shaker 58 is bolted to a first baffle 60 and a second baffle 62 that overlays the first baffle 60. The first baffle 60 is fastened to the first wall 26 of the hopper 44 and to the shaker 58 through a plate 59. The second baffle 62 is movably connected to the first baffle 60. Alternatively, this configuration may be reversed and the first baffle 60 mounted to the second wall 28 of the hopper 44 and the second baffle 62 may be movably mounted to the first baffle 60. The first baffle 60 and second baffle 62 may be fastened using screws, bolts, or any other known means of fastening. The second baffle 62 is adjustable through, for example slots 64 in the second baffle 62, to create a smaller or larger gap between the second baffle 62 and the second wall 28. The free end 65 of the second baffle 62 acts as a knife-edge when the shaker 58 is operated. The knife-edge engages the adjacent material in the hopper to prevent cavitation of the material. The edge cuts into the material and ensures that material is free to flow into the bottom 52 of the hopper 44. Additionally, the baffles 60, 62 support the material in the hopper 44 and prevent the weight of the material from resting upon the beater bar 22.

Material in the hopper 44 moves through the gap between the second baffle 62 and the second wall 28 to feed material to the bottom 52 of the hopper 44. By adjusting the second baffle 62 to generate a larger gap more material will feed into the bottom 52 of the hopper 44. By adjusting the second baffle 62 to generate a smaller gap less material will feed into the bottom 52 of the hopper 44. The shaker system 58 through the motor 66 vibrates the first baffle 60, the second baffle 62 to assist in breaking up material and feeding material through the gap and into the bottom 52 of the hopper 44.

It is a well-known property of the various materials used that the material may cavitate or bind as it feeds through the hopper 44. The shaker system 58 promotes a more even flow of material and prevents cavitation by breaking up the material and keeping the material moving through the gap at the second baffle 62. The vibration motor 66 may be mounted to any of the four walls 26, 28, 46, 48, preferably on the outside of the second wall 28 of the hopper 44. The vibration motor 66 is preferably electric, but may be any other means of providing power to the shaker system 58.

Figure 4:
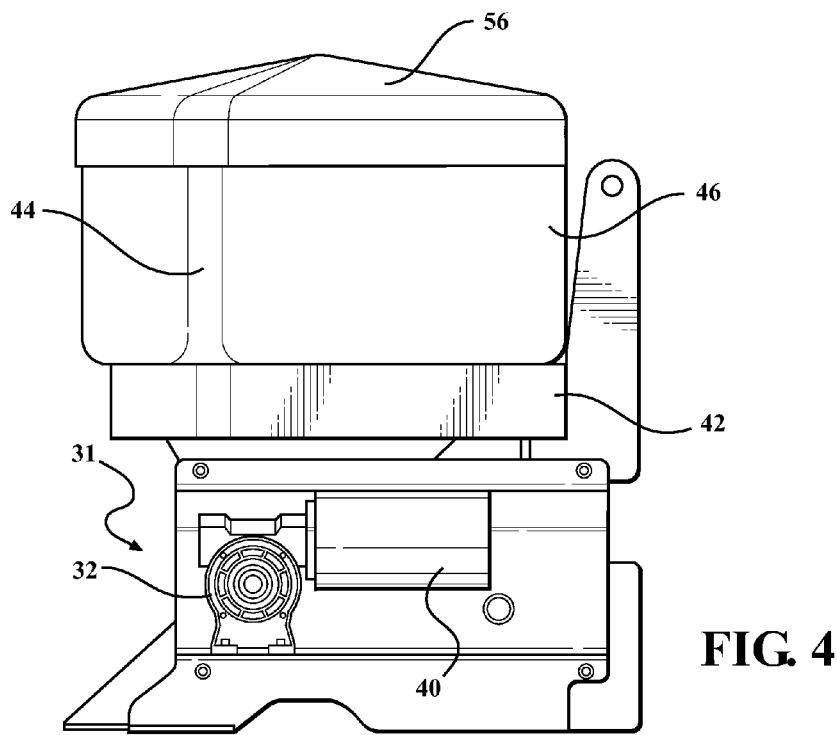
FIG. 4 is a side view of the material spreader of the present invention.
Figure 5:
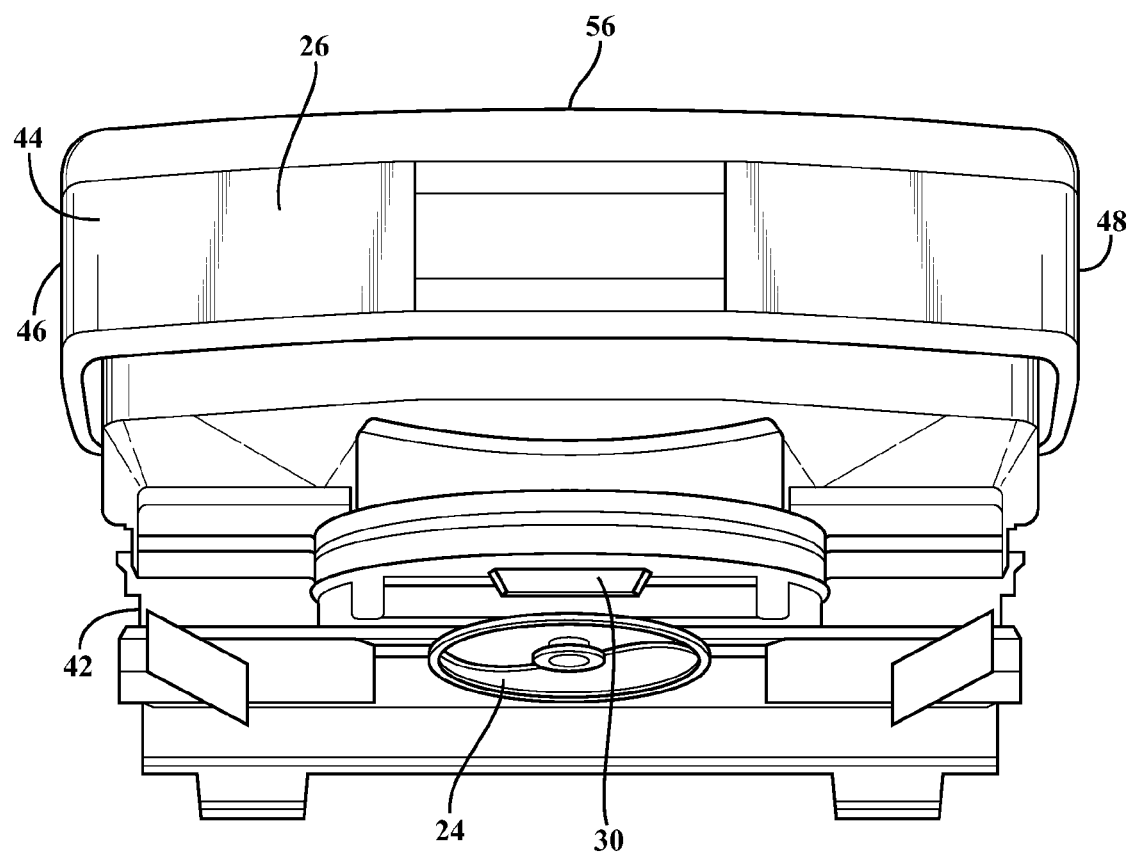
FIG. 5 is a front view of the second embodiment of the material spreader of the present invention.

As shown in FIG. 4, a motor 32 is mounted adjacent the hopper 44 and preferably on the frame 42. The motor 32 is connected to a transmission 40 for providing rotational force to the beater bar 22. The motor 32 is preferably an electric motor but may be any other means of providing power to the transmission 40. In the preferred embodiment, the motor 40 is a low rotations per minute (RPM) motor of about 1,750 RPM. An encoder can be used to control the motor's RPM. The transmission 40 is geared to provide rotation to the beater bar 22 at a rate that produces the desired distribution of material. The transmission 40 is connected to the beater bar 22 to provide the desired power from the motor 32 to the beater bar 22. In the disclosed embodiment, the transmission is geared to provide a 100 to 1 gear ratio. In this way, the motor RPM's can be controlled through an encoder to rotate the beater bar 22 at a rate as low as 1.75 RPM. At this low rate of a rotation, the spreader is capable of only spreading six (6) pounds of material per 1,000 feet. The disclosed embodiment has an upper spreading rate of about 30 pounds per 1000 feet. In the disclosed embodiment, a variable speed self-diagnosing digital controller 31 is used to control the motor 32 speed.

The beater bar 22 may engage a drum shaft bearing on the wall opposite the wall the transmission 32 is located to aid in rotating the beater bar 22. Depending on the nature of the distribution required by the operator, the transmission 32 may be geared to allow for greater coverage of material by distributing more material out of the hopper 44, or the transmission 32 may be geared to allow for more controlled distribution of material. This allows the operator to choose the desired material distribution coverage that best suits the operator's needs, including more efficient use of material and more precise material coverage on the surface.

The beater bar 22 engages the material in the bottom 52 of the hopper 44 using the paddles 34 and transports the material to the opening 30 defined in the first wall 26. A guide 68 extends outwardly from the first wall 26 and over the opening 30. The guide 68 deflects material being discharged from the opening 30 downwardly onto the surface.

The material may flow through the opening 30 and out of the hopper 44 directly to the surface below or in a second embodiment (which will be described below) onto a spinner 24 rotatably mounted to the hopper 44 below the opening 30. The spinner 24 is powered by a spinner motor 70. The material, if no spinner 24 is mounted to the hopper 44, will fall to the surface to achieve the desired effect of surface treatment, that is, removal of snow and/or ice or the application of seed or fertilizer. If a spinner 24 is attached to the hopper 44 beneath the opening 30, the material is directed onto the spinner 24 to be distributed by the spinner 24 thereby achieving the material coverage desired by the operator.

In an alternative embodiment, and as shown in FIGS. 5 through 8, the drop spreader device 20 of the present invention is generally the same as the drop spreader 20 described above except that the beater bar 22 includes shorter centrally mounted paddles 34 and augers 36, 38 are mounted on each side of the paddles 34 for feeding material to the paddles 34 and subsequently to spinner 24.

With reference to FIGS. 6 and 8, the beater bar 22 or material distribution shaft contains a plurality of paddles 34 that are centrally located. A first auger 36 is positioned on one end of the beater bar 22 nearest the third wall 46 and a second auger 38 is positioned on the other end of the beater bar 22 nearest the fourth wall 48. The paddles 34 of the beater bar 22 in this configuration are directly adjacent to the opening 30 of the hopper 44, which is about the same width as the paddles 34. The first and second augers 36 and 38 rotate in opposite directions to one another to auger the material in the bottom 52 to the paddles 34. As shown in FIGS. 6 and 8, the paddles 34 are radially disposed on the outside of the beater bar 22 on the same or nearly the same axis, such that as the beater bar 22 rotates, the paddles 34 will successively and consecutively engage the material on the bottom 52 of the hopper 44. As shown in FIG. 6, the beater bar 22 has six paddles 34 to engage the material. However, more than six or less than six paddles 34 may be used depending on the desired material distribution and coverage.

As in the previous embodiment, in the preferred embodiment, a shaker 58 and baffles 60, 62 are used to ensure sufficient material is supplied to the augers 36, 38 and paddles 34. The digital controller 31 is used to control the speed of motor 70.

The beater bar 22 engages the material in the center of the bottom 52 of the hopper 44 using the paddles 34 and transports the material to the opening 30 defined in the first wall 26. A guide 68 extends outwardly from the first wall 26 to direct the material to a spinner 24. The material flows through the opening 30, and out of the hopper 44, directly to a spinner 24 mounted to the hopper 44 below the opening 30 powered by a spinner motor 70.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A spreader device comprising:
   a spreader hopper; said spreader hopper including spaced apart front and back walls, spaced apart side walls and a top and bottom;
   a discharge opening positioned in said back wall adjacent and above the bottom of said hopper, said discharge opening extending transverse to said hopper and generally parallel to said front and back walls;
   a beater bar positioned adjacent said discharge opening said beater bar including at least first and second sets of paddles said first and second sets of paddles being disposed radially upon said beater bar, and each set of paddles being in a spaced apart single row creating a gap between each paddle, said first and second sets of paddles being offset such that the first set of paddles are opposite said gap in said second set of paddles and said second set of paddles are opposite said gap in said first set of paddles, said paddles picking up and moving material to said discharge opening, said paddles providing material control by preventing material from being discharged from said bottom with said hopper without movement of said paddles;
   a motor and high ratio transmission operatively connected to said beater bar for rotating said beater bar;
   whereby said beater bar can rotate between infinitely variable speeds, with said paddles moving material to said discharge opening and providing material control.

2. The spreader device of claim 1, wherein said front and back walls are sloped at different angles.

3. The spreader device of claim 2, wherein said front wall is sloped less than back wall.

4. The spreader device of claim 1, wherein said motor is a low rpm motor.

5. The spreader device of claim 1, wherein said high ratio transmission has a gear ratio between 100 to 1.

6. The spreader device of claim 1, wherein said beater bar has a low speed of 1.75 revolutions per minute and is capable of distributing approximately 6 pounds of material per 1000 feet.

7. The spreader device of claim 1, wherein said beater bar is capable of distributing 30 pounds of material per 1000 feet.

8. The spreader device of claim 1, wherein said beater bar includes multiple sets of paddles.

9. The spreader device of claim 1, further including a shaker having a first baffle.

10. The spreader device of claim 9, further including a second baffle adjustably mounted upon said first baffle.

11. The spreader device of claim 10, further including a device operatively connected to said first baffle.

12. A spreader device comprising:
    a spreader hopper; said spreader hopper including first and second spaced apart walls;
    a discharge opening positioned adjacent the bottom of the hopper, generally parallel to said first and second walls;
    a beater bar positioned adjacent said discharge opening said beater bar including paddles, said paddles moving material to said discharge opening said paddles providing material control;
    a low rpm motor and high ratio transmission operatively connected to said beater bar for rotating said beater bar;
    further including a shaker having a first baffle;
    whereby said beater bar can rotate between infinitely variable speeds with said paddles moving material to said discharge opening.

13. The spreader device of claim 12, wherein said high ratio transmission has a gear ratio between 100 to 1.

14. A spreader device comprising:
    a spreader hopper; said spreader hopper including first and second spaced apart walls;
    a discharge opening positioned adjacent the bottom of the hopper, generally parallel to said first and second walls;
    a beater bar positioned adjacent said discharge opening said beater bar including paddles, said paddles moving material to said discharge opening, said paddles providing material control;
    a motor and high ratio transmission operatively connected to said beater bar for rotating said beater bar;
    an auger positioned on opposite sides of said paddle, said auger moving material to said paddles;
    a shaker device having a first baffle;
    whereby said beater bar can rotate between infinitely variable speeds, with said paddle moving material to said discharge opening, with said paddles moving material to said discharge opening.

15. A spreader device comprising:
    a spreader hopper; said spreader hopper including first and second spaced apart walls;
    a discharge opening positioned adjacent the bottom of the hopper, generally parallel to said first and second walls;

a beater bar positioned adjacent said discharge opening said beater bar including paddles, said paddles moving material to said discharge opening, said paddles providing material control;

a motor and high ratio transmission operatively connected to said beater bar for rotating said beater bar;

further including a shaker having a first baffle;

whereby said beater bar can rotate between infinitely variable speeds, with said paddles moving material to said discharge opening and providing material control.

16. The spreader device of claim 15, wherein said first and second walls are sloped at different angles.

17. The spreader device of claim 15, wherein said first wall is sloped less than second wall.

18. The spreader device of claim 15, further including third and fourth walls, said discharge opening extends between said third and fourth walls.

19. The spreader device of claim 15, wherein said motor is a low rpm motor.

20. The spreader device of claim 15, further including a spinner positioned adjacent said discharge opening to receive material from said discharge opening and spread said material.

21. The spreader device of claim 20, further including a motor to drive said spinner.

22. The spreader device of claim 15, further including an auger positioned on opposite sides of said paddles, said auger moving material to said paddles.

23. The spreader device of claim 22, further including third and fourth walls, said auger mounted between said third and fourth walls.

24. The spreader device of claim 15, wherein said high ratio transmission has a gear ratio between 100 to 1.

25. The spreader device of claim 15, wherein said beater bar has a low speed of 1.75 revolutions per minute and is capable of distributing approximately 6 pounds of material per 1000 feet.

26. The spreader device of claim 15, wherein said beater bar is capable of distributing 30 pounds of material per 1000 feet.

27. The spreader device of claim 15, wherein said beater bar includes multiple sets of paddles.

28. The spreader device of claim 15, further including a second baffle adjustably mounted upon said first baffle.

29. The spreader device of claim 15, further including a device operatively connected to said first baffle.

* * * * *